Patented Oct. 17, 1939

2,176,266

UNITED STATES PATENT OFFICE 2,176,266

PROCESS FOR SOLIDIFYING PERMEABLE MASSES

Tore Gunnar Malmberg, Stockholm, Sweden

No Drawing. Application January 17, 1939, Serial No. 251,415. In Sweden February 12, 1938

5 Claims. (Cl. 61—36)

The present invention has for its object to render sand and gravel deposits, porous concrete, rock formations, soil and the like compact and impermeable to water and other liquids. The invention is particularly intended for consolidating of building grounds, tightening of leaky dam structures and porous bedding under and around such structures as well as under bridge pillars and pilings, for tunnel driving, shaft sinking, etc. The invention is also intended for tightening and consolidation of the drill hole walls when sinking wells, e. g. for oil, and for stablizing the drilling mud during such operations. Other objects and advantages of the invention will be more fully understood by the following specification.

Methods hitherto commonly used for tightening and consolidating purposes and consisting in the injection of various impermeating agents suffer from certain disadvantages which make their use difficult and render the desired action less efficient.

When employing cement injection, certain difficulties are thus encountered because of the fact that the cement suspension has a tendency to settle and filter itself off on its own precipitate. For this reason it happens that pumps and pipes are stopped up, but above all the faculty of penetration becomes low, particularly when the injection is made in a fairly tight medium, such as fine sand, clay, etc. To this comes that, owing to the comparatively long setting time (2 to 4 hours) of the cement, there is always a danger for a flushing out of the same before it has become sufficiently hardened, if water chances to seep through that part of the ground in which injection has been carried out.

Bitumen has also been employed as an impermeating agent both in the form of hot, molten bitumen, and as bituminous emulsions. In the former case the injection is hampered by great techincal difficulties. In the latter case the stiffness after coagulation is less satisfactory owing to the considerable degree of dilution which is generally employed when preparing water-bitumen-emulsions. It has been proposed to make additions of mineral ingredients such as clay, cement, etc. to the bituminous emulsion; these filling media, however, cause difficulties in regard to its stability, which is a necessary condition for the practical use of such bituminous emulsions.

The possibility of employing these methods is however above all restrained by the fact that the force of penetration becomes insufficient in the case of very fine-grained sand, or gravel containing fine-grained sand. The greatest difficulties are encountered, if the fine-grained sand contains clay. In this case the faculty of penetration will be highly reduced. The size of the particles in the suspension or emulsion and, to a certain extent, also its viscosity will in these cases limit the faculty of penetration, which will become insufficient even when using very high injection pressures.

Other methods, so called chemical injections, are generally based on the use of two solutions. A solution number 1 (generally a solution of water-glass) is first injected into the sand stratum or other medium to be compacted, following which a solution number 2 (e. g. calcium chloride) is injected, in order to precipitate the first solution with the formation of tightening gels. These methods all suffer from the fundamental disadvantage however, that the solution number 2 will to a large extent displace the solution number 1 without becoming mixed with and precipitating it. Practical tests have demonstrated that this leads to an excessive consumption of chemicals and that the tightening effect will be irregular. Sometimes the penetration is considerably hampered owing to the fact that the precipitate which forms in the contacting zone between the injection fluids will prevent a further penetration of the fluid number 2.

It has also been proposed to effect a delayed precipitation of the gel by adding small quantities of calcium hydroxide or calcium chloride to an alkali silicate solution, whereby it would be possible to inject to a greater depth before the formation of gel takes place and further penetration is rendered impossible. It has, however, been found that this modification of the above-mentioned methods does not lead to satisfactory results, partly because of the fact that the precipitation of gel will become incomplete and partly because the precipitation will take place in such a manner that the precipitate of silica will result in a form which is unsuitable for binding and consolidating purposes.

By using very dilute acids it is also to a certain extent possible to effect a delayed precipitation of gels from an alkali silicate solution but the precipitation will also in these cases be incomplete and the character of the gel unsatisfactory for the intended purposes.

The present invention relates to a method for tightening and consolidating by injection, which ensures good penetration of the injected solution at moderate pressures also into such stratas, layers and bodies which show only small permeability. The invention is characterized by the fact that the injection is carried out with a single solution which is prepared from alkali silicates, such as water-glass, in admixture with substances which have a lowering action on the hydroxyl-ion concentration of the solution without having any strong precipitating action on silicic acid, namely acid salts of weak acids, e. g., acid alkali or ammonium salts of carbonic acid, sulphurous acid, boric acid and oxalic acid, such as sodium bicarbonate (NaHCO₃), sodium bisulphite (NaHSO₃) sodium tetraborate (borax, Na₂B₄O₇), sodium dekaborate (Na₂B₁₀O₁₆), acid potassium oxalate (KHC₂O₄), potassium tetra oxalate (KHC₂O₄·H₂C₂O₄) and others.

A solution prepared in this way is injected into the material which is to be tightened or consolidated, before coagulation to any appreciable extent has taken place within the mixture. Such a solution does not coagulate with the precipitation of siliceous gels until after a certain time, owing to the reactions which take place in it between the acid salts and the alkali silicate. If the injection is carried out properly, using a solution which is free from precipitate when prepared and which has a low viscosity, it is possible to obtain a very good penetration. A certain time, e. g. 10 to 20 minutes, after the injection, the solution will coagulate in the injected ground, whereby this is compacted and tightened.

The time of coagulation may be regulated by selecting different concentrations and proportions of the chemicals forming part of the solution. The temperature is also of some effect since the time of coagulation tends to be prolonged at higher temperatures, a fact of special importance when carrying out injection in drill holes, deep oil wells and other deep shafts.

As an example of an injection fluid according to the invention may be mentioned a mixture prepared from 100 parts by volume of sodium bicarbonate solution containing 66 grams of bicarbonate per liter and 125 parts by volume of sodium silicate diluted to a specific gravity of 1.21. This mixture coagulates after about 15 minutes at room temperature.

The explanation of the fact that the acid salts of weak acids, e. g. sodium bicarbonate, as used according to the invention, give a retarded but efficient precipitation, in contradistinction to previously suggested precipitating agents, is rendered in the following:

When employing precipitating agents of the type calcium chloride or magnesium chloride the reaction between the agent and the silicate is almost instantaneous with the formation of practically insoluble silicates by a combining of the metal compound of the agent and the silicic acid of the alkali silicate (e. g. water glass). If the proportion of precipitating agent is reduced it is possible to obtain a certain retardation of the reaction velocity but the precipitation will be incomplete and the gel is obtained in a flocculent form which is of only slight tightening action. The same is true of precipitates obtained with calcium hydroxide in the form of milk of lime, namely that the gel which is thrown out, chiefly in the form of calcium silicate, will be flocculent and of very slight value as a tightening medium.

The disadvantages of employing acids as precipitating agent have already been mentioned. The process of precipitation will in such cases either take place at too high a velocity or, in the case of too small a proportion of acid, become incomplete. This fact is easily understood when it is considered that the alkali silicate in the aqueous solution is almost completely hydrolyzed and dissociated into ions of alkali and hydroxyl as well as into colloidal silicon dioxide, for instance according to the following reaction scheme:

$$Na_2SiO_3 + H_2O \rightarrow 2Na^+ + 2OH^- + SiO_2$$

The stability of the colloidal sol of silica in the solution is very much dependent on the magnitude of the hydroxyl ion concentration. The addition of an acid, even in such cases when this acid is weak, causes a strong local depression of the hydroxyl ion concentration, since an instantaneous and complete homogenizing of two solutions which are brought together is impossible to realize, the result being that silica gel is thrown out in a form which is unsuitable for tightening purposes.

The coagulating or precipitating agents employed according to the present invention have no such rapid and uncontrollable action. Owing to their chemical nature an addition of these compounds, even in comparatively large proportions, will only cause a slight change in the hydroxyl ion concentration whereby a slowly proceeding and controllable precipitation of siliceous gels will take place. Sodium bicarbonate, for instance, does not show any acid reaction and does not contain metal ions which have a precipitating action on alkali silicate with a formation of more or less insoluble silicates. It is, on the other hand, capable of binding such a quantity of hydroxyl ions, while at the same time being transformed into sodium carbonate, that the coagulation of the silica with the formation of a suitable gel will become complete after a certain length of time.

The ion-reactions which take place in this case may be said to be represented by a dissociation of the sodium bicarbonate into ions of sodium and "bicarbonate"

$$NaHCO_3 \longrightarrow Na^+ + HCO_3^-$$

The bicarbonate ions are in turn capable of binding hydroxyl ions according to the reaction $$OH^- + HCO_3 \longrightarrow H_2O + CO_3^-$$

Owing to the nature of the above outlined chain of reactions which is principally dependent upon the dissociation constants of the compounds in question, the silica will slowly coagulate in the form of a homogeneous and coherent gel which owing to its voluminous form has a good tightening action on the porous material into which the solution is injected.

The fact that the coagulation will not take place until after a certain time, following the mixing together of the precipitating agent and the alkali silicate solution, is of great importance since the homogeneous injection fluid will possess a very low viscosity during the first stage of operation and consequently be capable of being injected even into stratas and bodies which present a very low permeability owing to narrow pores. Investigations have demonstrated that suspensions of extra finely sifted cement (all particles passing a sieve of 10,000 mesh/square centimeter) were not capable of being injected into packed, graded sand having a grain size below 1 to 2 millimeters. Suspensions of washed clay were not capable of being injected to any appreciable depth into sand having a grain size of less than 0.5 to 1 millimeter, employing reasonable injection pressures. The injection fluid according to the invention, on the contrary, was easily injected into sand having a grain size ranging from 0.1–0.25 millimeter.

The invention is not limited to the above examples which only serve to typify the same. As should be evident from the foregoing the inventive principle rests in the employment of one single injection fluid mainly composed of an alkali silicate and a water soluble salt capable of a mild neutralizing action upon said silicate. Such a mild action which is rather to be considered as a buffering action than a direct neutralization is, according to the invention, effected by the use of acid salts of weak acids, i. e. compounds capable of acting as buffering substances employed for adjusting the pH-value of the alkali silicate slightly towards the acid side, whereby the desired slow precipitation of silica gel is brought about.

I claim:

1. A process for tightening and consolidating rock formations, sand and gravel layers, porous concrete, dam structures, shafts and drill holes, etc., comprising the step of preparing an aqueous mixture of an alkali silicate and a water soluble acid salt of a weak acid, injecting said mixture into the material to be treated prior to any appreciable coagulation reaction having taken place in the mixture, and letting the reaction between the alkali silicate and the acid salt proceed with a formation of silica gels in the injected material.

2. A process as claimed in claim 1 in which the acid salt is sodium bicarbonate.

3. A process as claimed in claim 1 in which the acid salt is sodium tetra borate.

4. A process as claimed in claim 1 in which the acid salt is sodium bisulphite.

5. A process for rendering sand and porous ground water tight comprising mixing together 100 parts by volume of a sodium bicarbonate solution containing 66 grams of bicarbonate per liter and 125 parts by volume of sodium silicate of specific gravity 1.21, injecting said mixture into the material to be treated while the mixture is still clear and letting it solidify after injection.

TORE GUNNAR MALMBERG.

DISCLAIMER 2,176,266.—*Tore Gunnar Malmberg*, Stockholm, Sweden. PROCESS FOR SOLIDIFYING PERMEABLE MASSES. Patent dated October 17, 1939. Disclaimer filed October 17, 1940, by the assignee, *The Dow Chemical Company*.

Hereby enters this disclaimer to claims 1, 2, and 3 of said patent.

[*Official Gazette November 12, 1940.*]

of less than 0.5 to 1 millimeter, employing reasonable injection pressures. The injection fluid according to the invention, on the contrary, was easily injected into sand having a grain size ranging from 0.1-0.25 millimeter.

The invention is not limited to the above examples which only serve to typify the same. As should be evident from the foregoing the inventive principle rests in the employment of one single injection fluid mainly composed of an alkali silicate and a water soluble salt capable of a mild neutralizing action upon said silicate. Such a mild action which is rather to be considered as a buffering action than a direct neutralization is, according to the invention, effected by the use of acid salts of weak acids, i. e. compounds capable of acting as buffering substances employed for adjusting the pH-value of the alkali silicate slightly towards the acid side, whereby the desired slow precipitation of silica gel is brought about.

I claim:

1. A process for tightening and consolidating rock formations, sand and gravel layers, porous concrete, dam structures, shafts and drill holes, etc., comprising the step of preparing an aqueous mixture of an alkali silicate and a water soluble acid salt of a weak acid, injecting said mixture into the material to be treated prior to any appreciable coagulation reaction having taken place in the mixture, and letting the reaction between the alkali silicate and the acid salt proceed with a formation of silica gels in the injected material.

2. A process as claimed in claim 1 in which the acid salt is sodium bicarbonate.

3. A process as claimed in claim 1 in which the acid salt is sodium tetra borate.

4. A process as claimed in claim 1 in which the acid salt is sodium bisulphite.

5. A process for rendering sand and porous ground water tight comprising mixing together 100 parts by volume of a sodium bicarbonate solution containing 66 grams of bicarbonate per liter and 125 parts by volume of sodium silicate of specific gravity 1.21, injecting said mixture into the material to be treated while the mixture is still clear and letting it solidify after injection.

TORE GUNNAR MALMBERG.

DISCLAIMER 2,176,266.—*Tore Gunnar Malmberg*, Stockholm, Sweden. PROCESS FOR SOLIDIFYING PERMEABLE MASSES. Patent dated October 17, 1939. Disclaimer filed October 17, 1940, by the assignee, *The Dow Chemical Company*.

Hereby enters this disclaimer to claims 1, 2, and 3 of said patent.

[*Official Gazette November 12, 1940.*]